United States Patent
Dziezanowski

(10) Patent No.: US 8,521,897 B2
(45) Date of Patent: Aug. 27, 2013

(54) GENERIC DATA EXCHANGE METHOD USING HIERARCHICAL ROUTING

(75) Inventor: Joseph J. Dziezanowski, Salisbury, NH (US)

(73) Assignee: Microscan Systems, Inc., Renton, WA (US)

(*) Notice: Subject to any disclaimer, the term of this patent is extended or adjusted under 35 U.S.C. 154(b) by 233 days.

(21) Appl. No.: 13/048,762

(22) Filed: Mar. 15, 2011

(65) Prior Publication Data

US 2012/0239820 A1 Sep. 20, 2012

(51) Int. Cl.
*G06F 15/16* (2006.01)
(52) U.S. Cl.
USPC ............................................. 709/230
(58) Field of Classification Search
USPC .................................. 709/230, 246
See application file for complete search history.

(56) References Cited

U.S. PATENT DOCUMENTS

| | | |
|---|---|---|
| 6,466,971 B1 | 10/2002 | Humpleman et al. |
| 6,868,416 B2 | 3/2005 | Choi et al. |
| 2005/0021547 A1* | 1/2005 | Emaru et al. ............... 707/100 |
| 2005/0033820 A1* | 2/2005 | Steindl ............... 709/213 |
| 2005/0034131 A1 | 2/2005 | Deshpande |
| 2008/0037453 A1 | 2/2008 | Bolt et al. |
| 2009/0204725 A1* | 8/2009 | Liu et al. .................. 709/246 |
| 2009/0228122 A1* | 9/2009 | Baier et al. .................. 700/83 |
| 2010/0049701 A1* | 2/2010 | Miller et al. .................. 707/4 |
| 2010/0185645 A1* | 7/2010 | Pazdziora .................. 707/760 |
| 2011/0061015 A1* | 3/2011 | Drees et al. .................. 715/771 |

OTHER PUBLICATIONS

PCT/US2012/027141—International Search Report and Written Opinion, mail date Sep. 25, 2012, 6 pages.

* cited by examiner

*Primary Examiner* — Jason Recek
(74) *Attorney, Agent, or Firm* — Blakely Sokoloff Taylor & Zafman LLP

(57) ABSTRACT

A process including retrieving a list of one or more candidate objects with which an origin object can communicate using a standard command language, wherein at least one of the one or more candidate objects uses a command language different than the standard command language. The process queries the schema of one or more target objects selected from among the one or more candidate objects and uses the standard command language to transmit to the one or more target objects commands and/or data consistent with the schemas of the target objects.

16 Claims, 12 Drawing Sheets

```
<mixl version="1.0">
  <route ip="10.20.1.17" service="mixl">
    <route service="vscape">
      <cmd act="gettree" >
    </route>
  </route>
</mixl>
```

*Fig. 5A*

```
<mixl version="1.0">
  <route ip="10.20.1.17" service="mixl">
    <route service="vscape">
      <cmd act="gettree" >
        <route service="xscape">
          <cmd act="gettree">
        </route>
    </route>
  </route>
</mixl>
```

*Fig. 5B*

```
<mixl version="1.0">
  <response tag="cmd" path="10.20.1.17/mixl/vscape" status="ok">
    <steps>
      <step sym="Insp1" guid="99A877C0-2961-11D1-82C8-006097608417" >
        <name>Inspection</name>
        <category>3</category>
        <handle>185182120</handle>
        <datums>
          <datum sym="Err" guid="54F8D2A8-95FA-11D0-AA2E-0020AF6308FE" >
            <name>Error Code</name>
            <category>131072</category>
            <handle>184298056</handle>
          </datum>
          <datum sym="Status" guid="0E5D0C28-4E7A-11D0-AA2E-0020AF6308FE" >
            <name>Status</name>
            <category>131072</category>
            <handle>184296352</handle>
          </datum>
                    ... etc ...

</step>
    </steps>
  </cmdr>
</mixl>
```

*Fig. 11A*

```
<response path="10.20.1.17/mixl/vscape/MyObj"
          tag="get" field=" mybin" status="ok">
  <mybin offset=0 length=1024 guid="54F8D2A8-95FA-11D0-AA2E-0020AF6308FE" />
</response >
```

*Fig. 11B*

```
<graphics>
  <svg>
    <g fill="none" stroke="black" stroke-width="3">
      <line x1="0" y1="1.5" x2="400" y2="1.5"/>
      <line x1="1.5" y1="0" x2="1.5" y2="150"/>
    </g>
    <g>
      <text x="30" y="30" font-size="20" font-family="Verdana">
        Some Text
      </text>
    </g>
  </svg>
</graphics>
```

*Fig. 11C*

GENERIC DATA EXCHANGE METHOD USING HIERARCHICAL ROUTING

TECHNICAL FIELD

The present invention relates generally to data communication and in particular, but not exclusively, to a generic data exchange method using hierarchical routing.

BACKGROUND

Many modern systems, such as machine vision systems, consist of multiple different components coupled together in such a way that they can communicate and interact with each other. Coupling of the components is usually accomplished using a combination of hardware and software—the hardware provides the tangible physical link between components, while the software controls the hardware and can perform other functions.

While these systems offer many advantages, one disadvantage they have is that different components in the system may operate under different protocols and/or understand different command languages. As such, a user of the system who wants to communicate with a specific component must know both the communication protocol needed to reach the component and the commands understood by the component. In a system with many different components, that means that a user must know multiple different protocols and command languages or structures to be able to interact with all the different components in a system.

BRIEF DESCRIPTION OF THE DRAWINGS

Non-limiting and non-exhaustive embodiments of the present invention are described with reference to the following Figs., wherein like reference numerals refer to like parts throughout the various views unless otherwise specified.

FIGS. 5A-5B are listings illustrating the structures of different embodiments of a request package.

FIGS. 11A-11C are listings illustrating the structures of different embodiments of a response package.

DETAILED DESCRIPTION OF THE ILLUSTRATED EMBODIMENTS

Embodiments of a system and method for generic data exchange method using hierarchical routing are described. Numerous specific details are described to provide a thorough understanding of embodiments of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
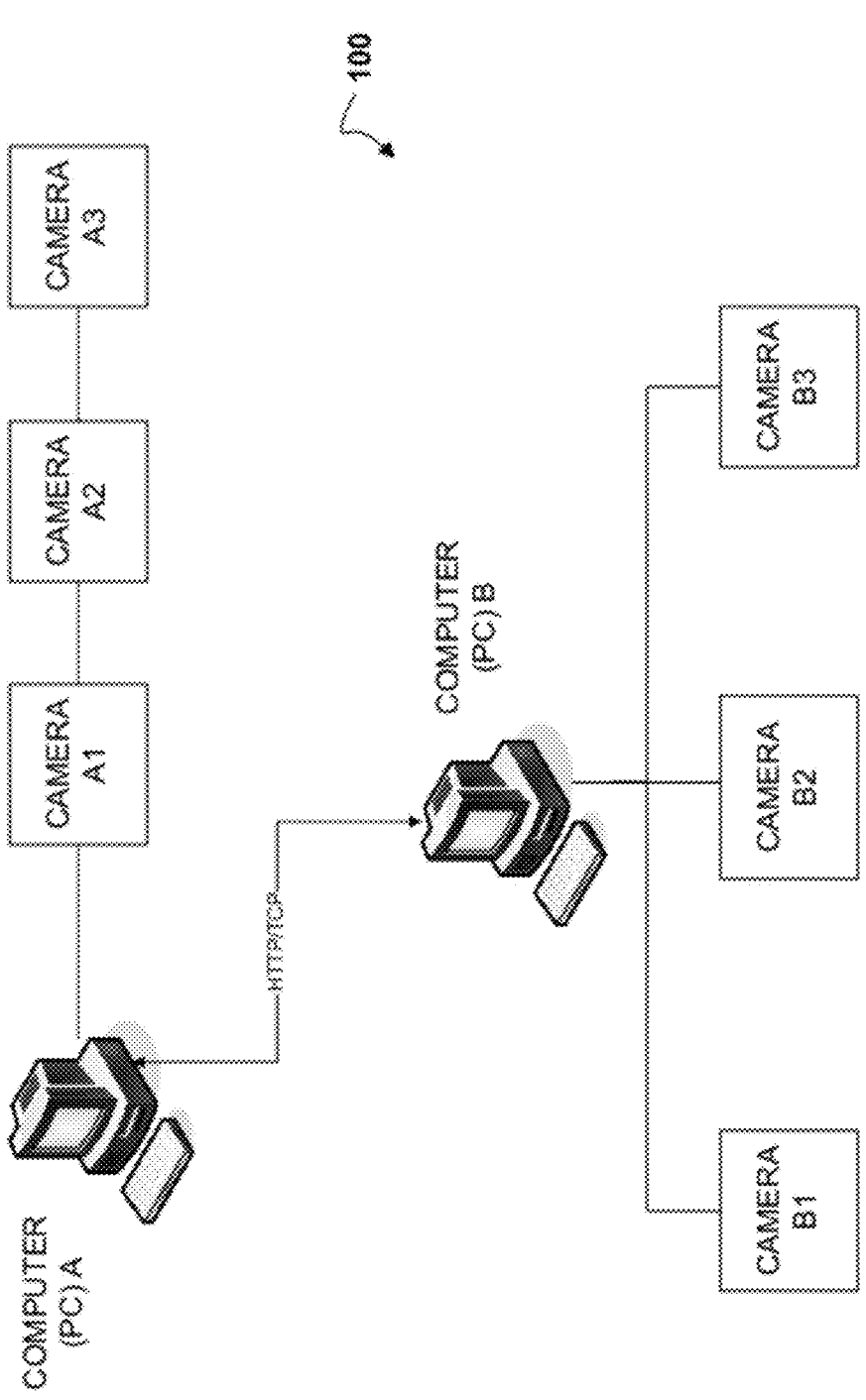
FIG. 1 is a block diagram of an embodiment of a machine-vision system.

FIG. 1 illustrates an embodiment of a machine vision system 100. System 100 includes machine vision cameras A1-A3 coupled in a daisy-chain configuration to computer A, such as a personal computer, and machine vision cameras B1-B3 coupled in a bus configuration to computer B. Computer A is coupled to computer B by a communication link, such as an Ethernet, TCP, HTTP or other such connection. In different embodiments, the communication link between components in system 100 can be hard-wired, wireless, or some combination of the two.

Within machine vision system 100, cameras A1-A3 need not all be the same type of camera and, similarly, cameras B1-B3 need not all be the same type of camera, nor do they need to be coupled by the same kind of communication link. If the cameras are different, it can happen that the cameras operate using different software, different command languages and different communication protocols. In such an arrangement, a user operating cameras A1-A3 from computer A must know all the different command languages and communication protocols to be able to communicate with and operate the cameras. A user operating cameras B1-B3 from computer B faces a similar predicament. An extra layer of complication is added when a user on computer B wants to operate cameras A1-A3 through the network connection between computer B and computer A, as the network connection can add its own command language and protocol.

Figure 2:
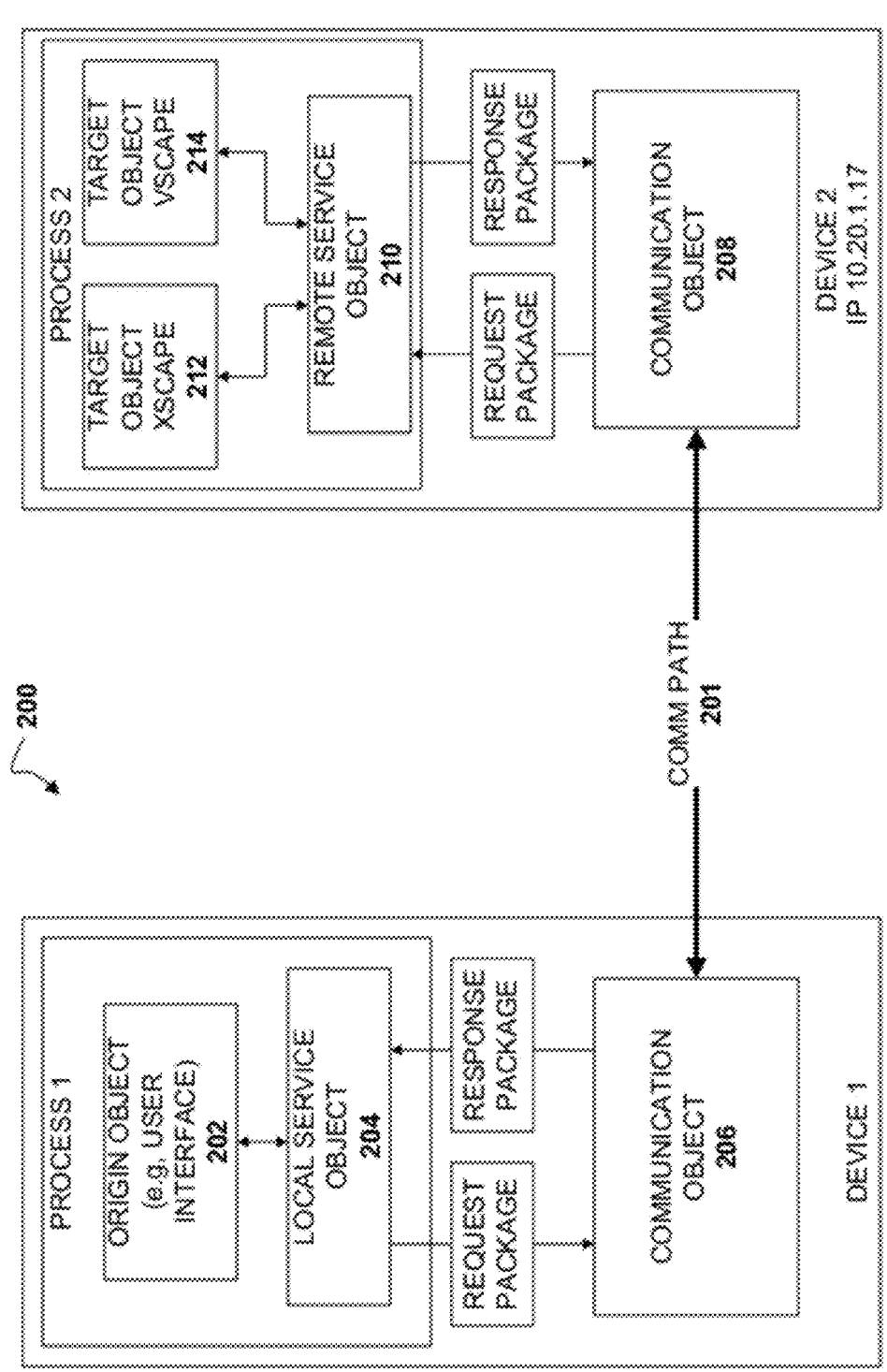
FIG. 2 is a block diagram of an embodiment of a system or framework for data exchange between objects.

FIG. 2 illustrates an embodiment of a framework 200 for generic data exchange among different components. Framework 200 includes two devices, device 1 and device 2, communicatively coupled by a communication path 201. In one embodiment devices 1 and 2 can be any two devices within a machine vision system such as system 100. For example, device 1 can be a computer such as a PC A while device 2 can be a machine vision camera such as camera B2, but in other embodiments device 1 and device 2 can be other kinds of devices.

Device 1 can include hardware components such as a processor, memory, storage, hardware communication interfaces, and so forth. One or more processes such as process 1 can run on the processor. Within process 1 are instances of an origin object 202 and a local service object 204. As used herein, the term "object" is intended to have the meaning associated with the term in object-oriented programming; that is, an object is a discrete software entity that can include both routines and data, that can call and be called by other objects, and that includes certain properties on its own or in relation to other classes of objects such as derivation, inheritance, and the like. In one embodiment origin object 202 can be a user interface, but in other embodiments origin object 202 can perform some other function.

Local service object 204 also runs in process 1 and can communicate with origin object 202 as well as with other objects that can be within process 1 or in other processes. In the illustrated embodiment, then, local service object 204 generally serves to transfer commands and data between objects inside and outside process 1. In the embodiment shown, local service object 204 can transmit a request package received from origin object 202 out of process 1 and can receive a response package from outside process 1 and transmit it to origin object 202. As further described below the request package and response package use a standard command language that is understood by local service object 204.

Communication object 206 also runs on device 1. In the illustrated embodiment an instance of communication object 206 runs in some other process outside process 1, but in other embodiments it could run within process 1. Communication object 206 functions to exchange information between device 1 and device 2 via communication path 201. In one embodiment, communication object 206 can be a Windows Communication Foundation (WCF) object, but in other embodiments other types of communication objects can be used, depending on the nature of device 1 and what communication protocols need to be supported. Among other types of data it can exchange, in the illustrated embodiment communication object 206 can receive a request package from local service object 204 and transmit it outside device 1, and similarly can receive a response package from outside device 1 and transmit it to local service object 204.

Communication path 201 provides a route through which data can be exchanged between device 1 and device 2. In one embodiment, communication path 201 can be a hard-wired connection, but in other embodiments it can be a wireless connection, and in still other embodiments it can be a combination of hard-wired and wireless connections. Communication path 201 can use different communication protocols in different embodiments, usually depending on the protocols supported by communication objects 206 and 208 on either end of the communication path. Examples of communication protocols that can be used include Ethernet, TCP/IP, HTTP, HTTPS, a Web service interface such as SOAP, and so forth. In the illustrated embodiment, device 2 has an IP address of 10.20.1.17, indicating the TCP/IP is the communication protocol being used.

Device 2, like device 1, can include hardware components such as a processor, memory, storage, hardware interfaces, and so forth. One or more processes such as process 2 can run on the processor. Running within process 2 are instances of one or more target objects, such as target object 212 (named "xscape") and target object 214 (named "vscape"), as well as an instance of a remote service object 210 that can communicate with the target objects and with communication object 208. Although only two target objects are shown in the illustrated embodiment, device 2 will generally include one or more candidate objects running within one or more processes with which origin object 202 can communicate using the illustrated framework, and any of the candidate objects is an object that can be chosen as a target object. As further discussed below, by issuing the necessary commands (see, e.g., FIGS. 5A-5B), origin object 202 can select one or more target objects with which it wants to communicate from among the candidate objects.

Remote service object 210 also runs in process 2 and can communicate with communication object 208 and with target objects 212 and 214, as well as with other candidate objects that can be within process 2 or in other processes on device 2. In the illustrated embodiment, then, remote service object 204 generally serves to transfer commands and data between objects inside and outside process 2. In the embodiment shown, remote service object 210 can receive a request package from communication object 208 and can transmit a response package from target objects 212 and 214 to communication object 208. The request package and response package use a standard command language that is understood by remote service object 210.

Communication object 208 also runs on device 2. In the illustrated embodiment an instance of communication object 206 runs outside process 2, but in other embodiments it could run within process 2. As with communication object 206, communication object 208 functions to exchange information between device 1 and device 2 via communication path 201. In one embodiment, communication object 208 can be of the same type as communication object 206, such as a Windows Communication Foundation (WCF) object, but in other embodiments other types of communication object 208 can be used, provided that communication object 208 supports the protocol needed to communicate with communication object 206. Among other types of data it can exchange, in the illustrated embodiment communication object 208 can receive a response package from remote service object 210 and transmit it outside device 2 and similarly can receive a request package from outside device 2 and transmit it to remote service object 210.

Operation of framework 200 begins, in one embodiment, with origin object 202. Initially, origin object 202 wants to communicate with objects on device 2, but doesn't know which objects on device 2 are candidates for communication, so it assembles a first request package that includes commands in a standard command language. The standard command language can include route commands that will route the first request package to remote service object 210, as well as commands that query the namespace of the remote service object to determine a list of candidate objects with which the remote service object, and hence origin object 202, can communicate. The commands can also include commands to query the schema of each candidate object. The first request package is then routed to local service object 204, which processes the request package, calls communication object 206, and passes the request package to communication object 206 for transfer over communication path 201. Communication path 201 transmits the request package to communication object 208, which then transmits it to remote service object 210. Remote service object 210 processes the namespace query and the schema queries and assembles the results into a first response package, and transmits the first response package to communication object 208, which then transmits the first response package to origin object 202 via communication path 201, communication object 206, and local service object 204.

Having received the first response package, origin object 202 (or, more accurately, a user of object 202) can choose one or more target objects with which to communicate from among the candidate objects identified by the remote service object (i.e., the namespace of remote service object 210) and, having queried the schemas of the candidate objects, can assemble a second request package with the correct routing information and with commands to be executed by the one or more target objects, as well as data consistent with the respective schemas of the target objects. The second request package is then routed to the target object or objects the same way the first request package was routed. In response to the second request package, remote service object 210 assembles a second response package based on responses from the target objects. The response package can include a header and a payload. The second response package is then routed back to the origin object the same way the first response package was routed.

In some cases, the payload of the second response package can include data in a format that cannot be handled by the communication protocol used by communication path 201 and communication objects 206 and 208. In such cases, communication object 208 may need to encode the payload before transmission and communication object 206 may need to un-encode the payload before transmitting the second response package to origin object 202. Of course, in other embodiments of the operation of framework 200 it is possible that the target objects and their schemas are known beforehand. In such cases, the user could simply use the second request package and the process described above for the first request package and first response package would be unnecessary. Further details of the operation of framework 200 are provided below with reference to FIGS. 4-11.

Figure 12:
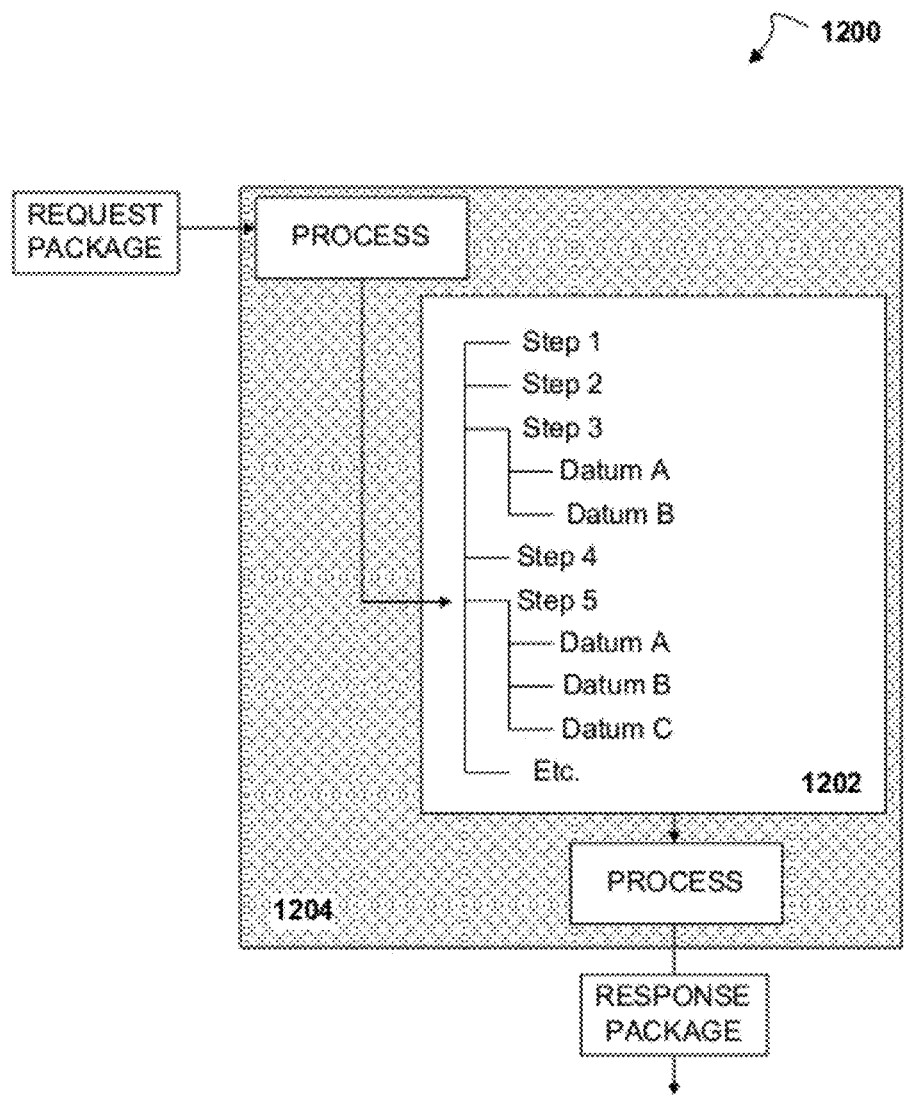
FIG. 12 is a block diagram of an embodiment of a target object.

Framework 200 offers multiple advantages. Among other things, framework 200 is very light weight, meaning that it implements a very minimal schema that is easily overlaid on other existing schemas, for example as shown in FIG. 12, and otherwise uses minimal support code, such as the parser that can be found in embodiments of local service object 204. This combination of a minimal schema and minimal support code allows framework 200 to be substantially self-contained, meaning that it requires few or no links to other existing communication frameworks, object frameworks or extensive external libraries. The minimal, substantially self-contained nature of framework 200 allows existing implementations of services, objects, etc, to be adapted to function within the framework with minimal code changes, and also allows the framework to be easily adapted to any kind of processing hardware, operating system, etc., without adversely affecting operation.

Figure 3B:
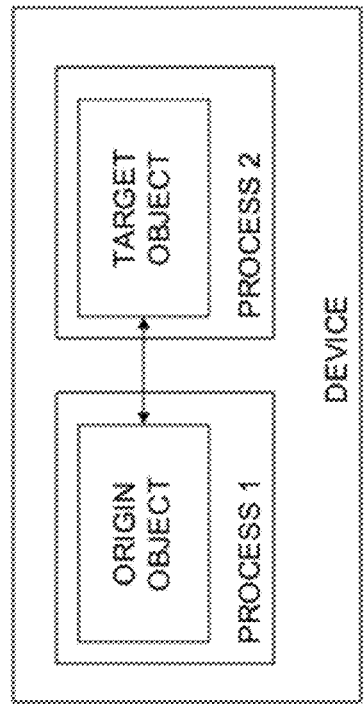
FIGS. 3A-3C are block diagrams illustrating different embodiments of data exchanges between objects.
Figure 3A:
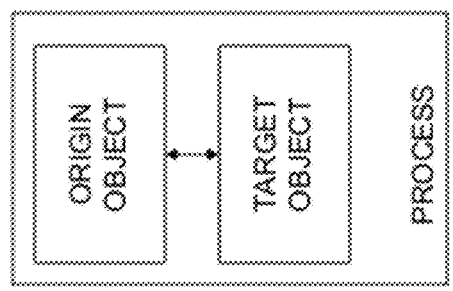
Figure 3C:
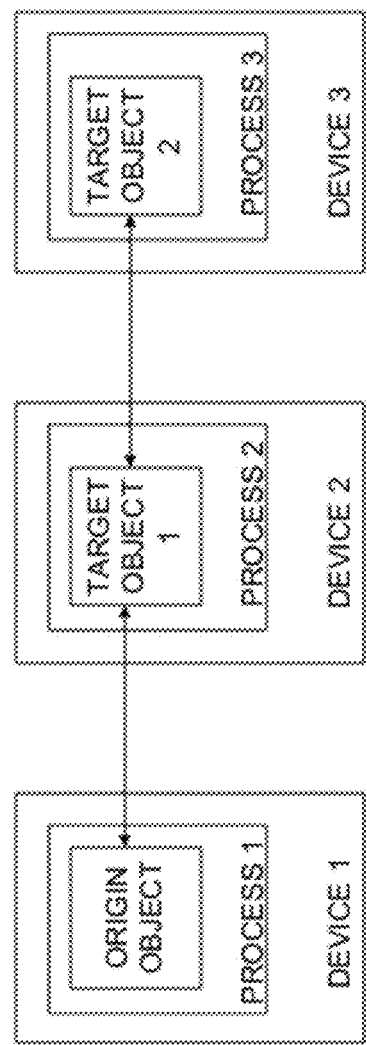

FIGS. 3A-3C illustrate alternative embodiments configurations that can communicate using a framework such as framework 200. Framework 200 illustrates an embodiment of communication framework applied to multiple devices, but in other embodiments other communications are possible. FIG. 3A illustrates an embodiment in which the communication is among instances of origin and target objects running within the same process on the same device. In this embodiment, the communication path is established by a direct call from one object to the other, and instances of intermediary objects such as the local and remote service objects and the communications objects are not necessary. FIG. 3B illustrates an embodiment in which two processes run on the same device and communication is among an origin object in one process and a target object in the other process. In this embodiment, the communication path could be established using named pipes or, in an embodiment where the different processes are running on different (asymmetrical) CPU cores, using shared memory. FIG. 3C illustrates an extension of FIG. 2 in which communication between the origin object and a target object can involve multiple hops, such as when the origin object can communicate with target object 2 via intermediary device 2.

Figure 4:
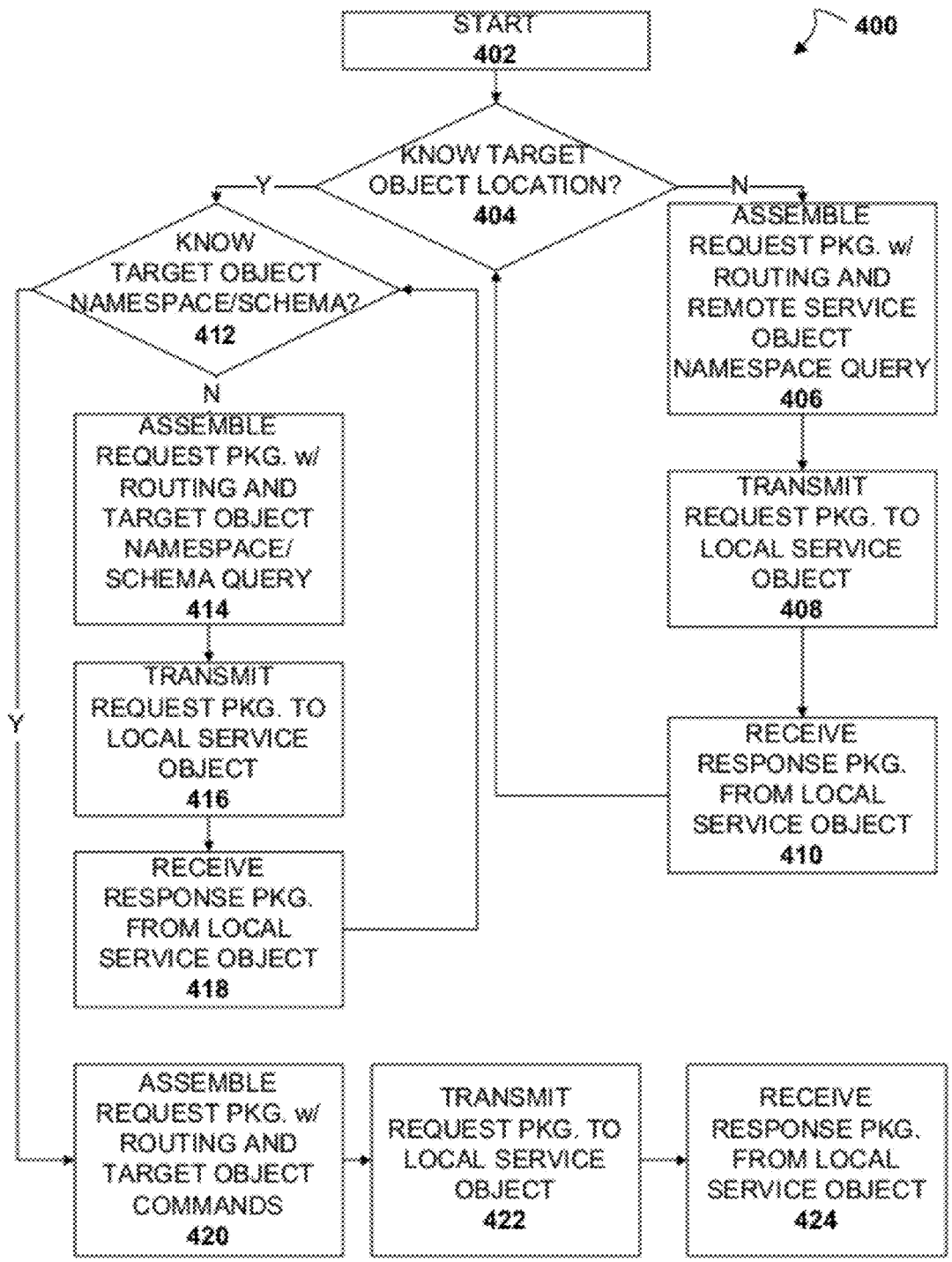
FIG. 4 is a flowchart illustrating an embodiment of a process at an origin object.

FIG. 4 illustrates an embodiment of a process 400 for an origin object such as origin object 202 (see FIG. 2). The process starts at block 402. At block 404, the process checks whether the origin object knows the target object with which it wants to communicate. If the origin object does not, then the process proceeds to block 406, where the origin object assembles a request package that includes commands in a standard command language. The commands can include routing commands to direct the request package to the correct remote service object and query commands to determine the namespace of the particular remote service object—that is, the list of objects with which the remote service object can communicate, and hence a list of candidate objects with which the origin object can communication. In one embodiment the request package can also include schema query commands to determine the schema of each candidate object.

Once the request package is ready, at block 408 the origin object transmits the request package to the remote service object, for example as shown in FIG. 2. At block 410, the process receives a response package from the remote service object. The response package includes a header and a payload; in this case the payload can include the namespace of the remote service object, which will be a list of candidate objects with which the origin object can communicate. The process then returns to block 404, where it checks whether the one or more target objects with which the origin object wants to communicate are known after return of the response package. If the target object is known, then the process moves to block 412.

At block 412, the process checks whether the namespace and schema of the target objects are known. If they are not, then the process proceeds to block 414, where the origin object assembles a request package that includes commands in a standard command language. The commands can include routing commands to direct the request package to the correct target objects, query commands to determine the namespace of the particular target object, and schema query commands to determine the schema of each target object. Once the request package is ready, at block 416 the origin object transmits the request package to the target objects. At block 418, the process receives a response package from the target objects. The response package can include the namespace of the targets object, as well as the schemas of the target objects if the schema query was used. The process then returns to block 412, where it checks whether the namespace and/or schema of the target objects are known after return of the response package.

If at block 412 the namespace and schema of the target object are known, then the process moves to block 420, where the origin object assembles a request package that includes commands for the one or more target objects in the standard command language. The commands can include routing commands to direct the request package to the correct target objects, and commands that cause the target object to take some action, such as returning data. Once the request package is ready, at block 422 the origin object transmits the request package to the target objects. At block 424, the process receives a response package from the target objects. The payload of the response package from the target objects can include confirmation from the target objects that the commands were carried out or can include data requested from the target objects (see, e.g., FIGS. 11B-11C).

Of course, in different embodiments it can be possible to bypass or omit one or more blocks from process 400. For example, if the location, namespace and schema of all the desired target objects are known in advance, process 400 can be started at block 420 instead of block 402.

FIGS. 5A-5B illustrate embodiments of a request package. FIG. 5A shows, with reference to framework 200, a request package that includes nested tags, in extensible markup language (XML) format, to get the tree (a listing of steps and datums) from target object 214, whose name is "vscape." The request package start with a route tag that specifies the route the request package should take to get to the target object. In this case, the route is specified by providing the IP address of device 2, which is 10.20.1.17, and by providing the name of the remote service object, which in the illustrated embodiment is "mixl." The next command in the hierarchy is another route tag, which specifies how the package should be routed after it arrives at the remote service object; in this case, the second route tag specifies that the request package should be routed to target object "vscape." The final nested tag is a command tag, which is routed to object "vscape" so that the commands in the tag can be executed. FIG. 5B shows an alternative embodiment of a request package that contains commands for multiple target objects at once. FIG. 5B illustrates a request package that provides commands to both objects "vscape" and "xscape." Other embodiments of a request package can include other tags beyond those shown in FIGS. 5A-5B. A non-exhaustive list of tags that can be used includes:

<route>—if the destination name is understood, resolve it into an Object reference. Then for each of the child nodes in the object call the object's virtual method.

<cmd>—do the action specified in the "act" attribute. The command in the act attribute is specific to the target object.

<queryschema>—return detailed datatype information by using standard <schema> tags as defined by w3.org. An object can represent an arbitrarily complex datatype. Each item that can be individually read or written is called a field.

<get> & <set>—get or set a field value from a target object that has previously been queried for its schema. Multiple fields can be handled at once.

<subscribe> & <unsubscribe>—an object would like to have data "pushed" to it whenever there's an update.

<response>—the response to a request. This can be directly returned in a synchronous request, or returned later if asynchronous.

Figure 6:
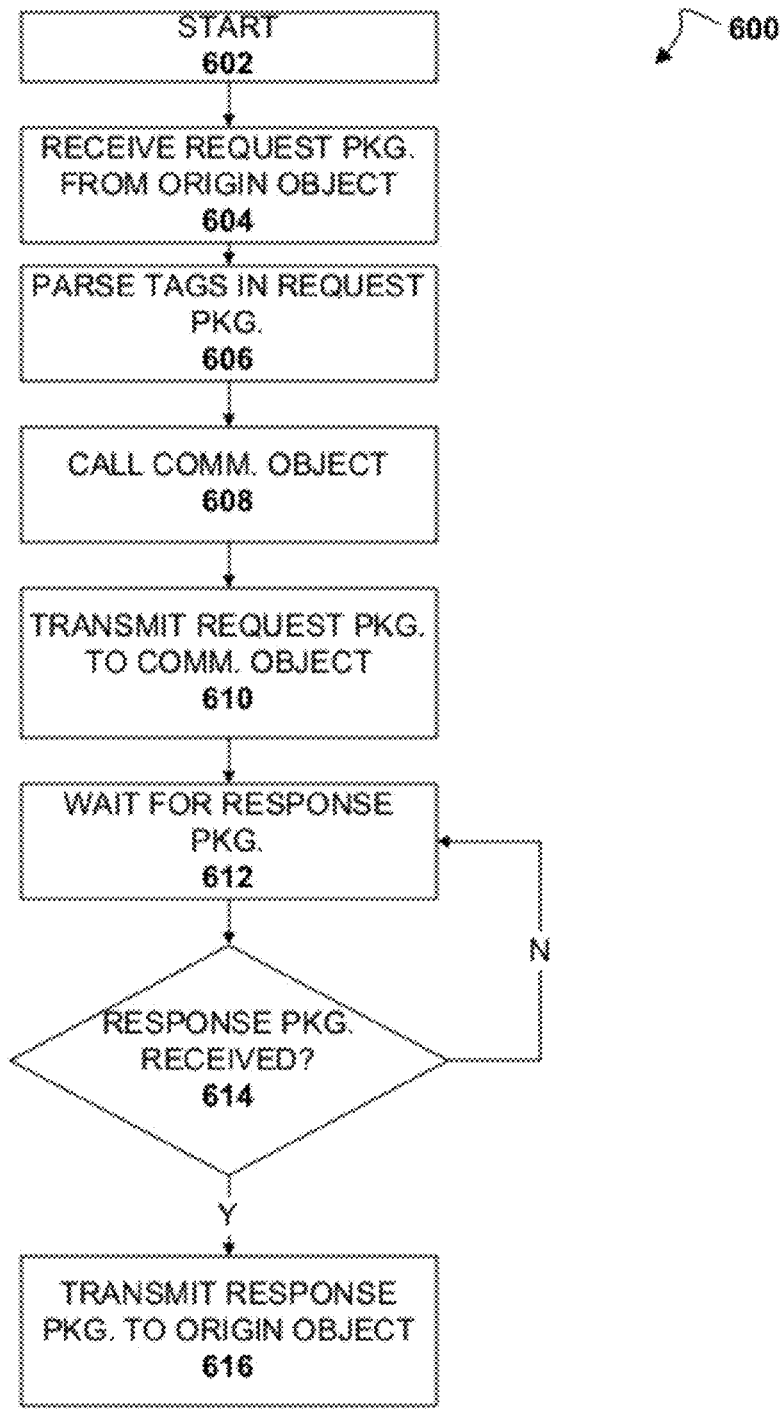
FIG. 6 is a flowchart of an embodiment of a process for a local service object.

FIG. 6 illustrates an embodiment of a process 600 that can be carried out by a local service object such as object 204 (see FIG. 2). The process starts at block 602. At block 604 the local service object receives a request package from the origin object, and at block 606 it proceeds to parse the command language—that is, the tags—in the request package. In one embodiment, the tags can be parsed into a Document Object Model (DOM) tree, but other types of parsing are possible in other embodiments.

At block 608, the local service object calls a communication object and at block 610 it transmits the request package to the communication object. After block 610, the local service object is finished with processing the request package, so at block 612 it waits to receive a response package that responds to the commands in the request package. The local service object does not necessarily enter a wait state where it can do nothing else until it receives a response; it can be possible for the local service object to be able to process other request packages while waiting for responses to previous request packages. At block 614, the local service object checks whether a response has been received. If no response has been received it returns to block 614, but if a response has been received it proceeds to block 616 where it transmits the response to the origin object.

Figure 7:
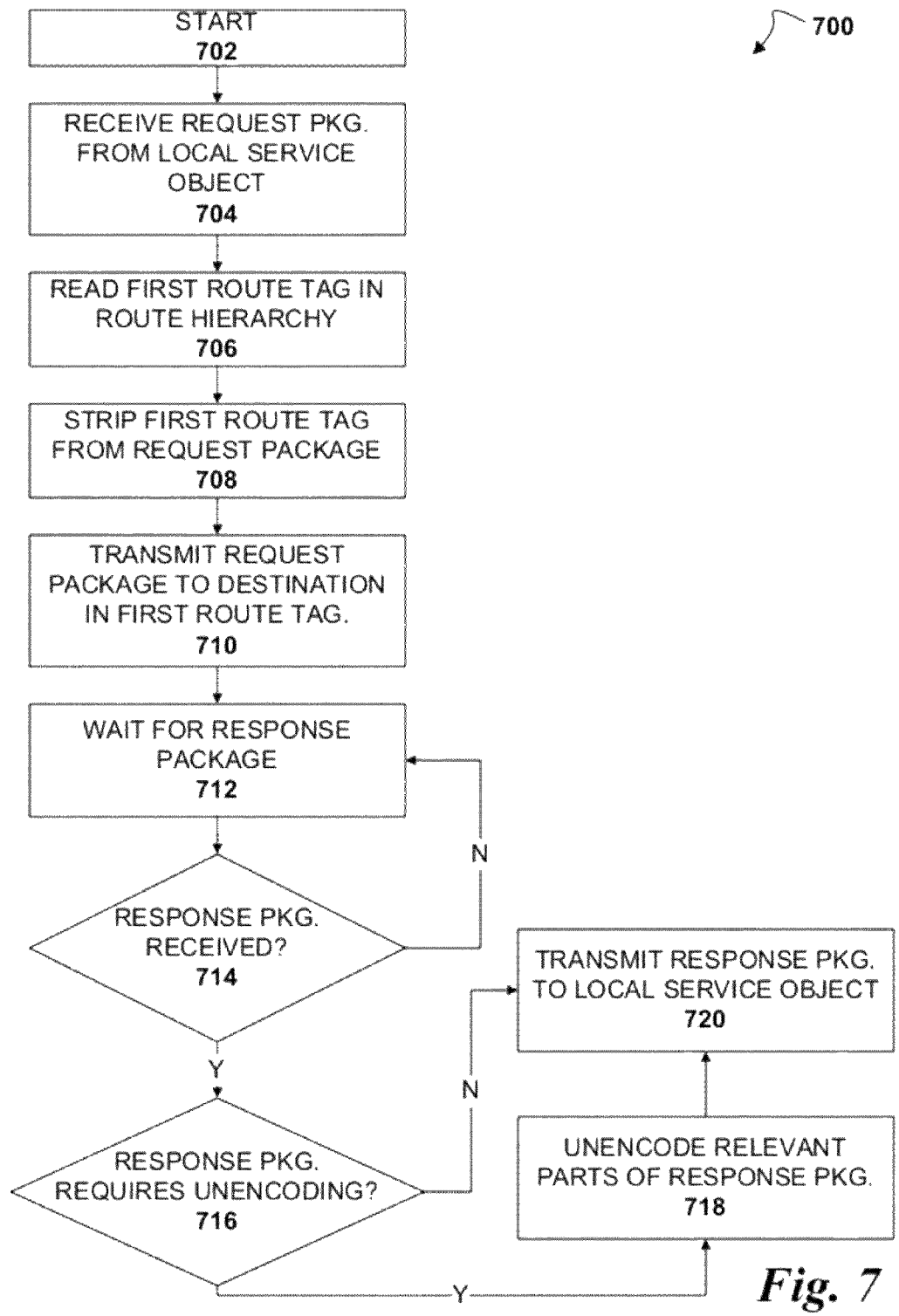
FIG. 7 is a flowchart of an embodiment of a process for a communication object.

FIG. 7 illustrates an embodiment of a process 700 for a communication object such as communication object 206 (see FIG. 2). The process starts at block 702. At block 704 the communication object receives the request package from the local service object, at block 706 it reads the first route tag in the command hierarchy and at block 708 it strips the first route tag from the request, so that the next route tag in the hierarchy will be the first tag seen by the object specified in the previous route tag. At block 710, the communication object transmits the request package to the destination specified in the first route tag.

After block 710, the communication object is finished with processing the current request package, so at block 712 it waits to receive a response package that responds to the commands in the request package. The communication object does not necessarily enter a wait state where it can do nothing else until it receives a response; it can be possible for the communication object to be able to process other request packages while waiting for responses to previous request packages. At block 714, the local service object checks whether a response has been received. If no response has been received it returns to block 712.

If at block 714 a response has been received, the process goes to block 716 where it checks whether the response package requires any decoding. In embodiments where the communication protocol supported by the communication objects and communication path cannot transfer the response package's payload in its native format, it can be necessary to encode the payload before transmission and decode it after reception. For example, if the response package payload includes binary data and the communication path and communications objects do not support binary, it can be necessary to encode the binary into a form that the communication elements can support. In one embodiment, binary data can be encoded and decoded using uuencode, but in other embodiments other methods can be used.

If at block 716 the response package does not required decoding, then the process goes to block 720, where it transmits the response package to the local service object. Otherwise, if the response package payload was encoded for transmission and now requires decoding, it proceeds to block 718, where it decodes the payload, and then proceeds to block 720 where it transmits the decoded response package to the local service object.

Figure 8:
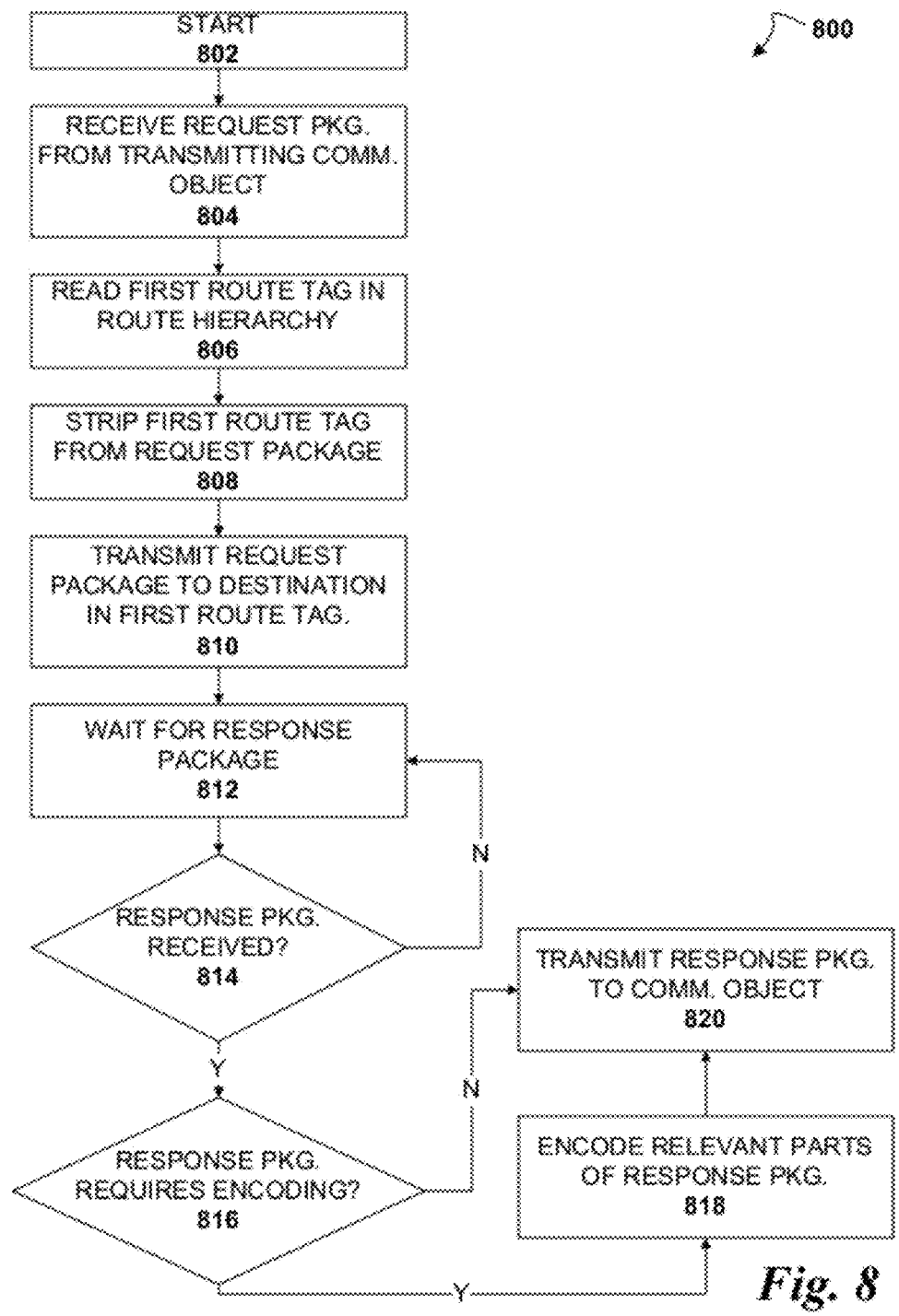
FIG. 8 is a flowchart of an embodiment of a process for a communication object.

FIG. 8 illustrates an embodiment of a process for a communication object such as communication object 208 (see FIG. 2). The process starts at block 802. At block 804 the communication object receives the request package from the transmitting communication object, at block 806 it reads the first route tag in the command hierarchy and at block 808 it strips the first route tag from the request, so that the next route tag in the hierarchy will be the first tag seen by the object specified in the previous route tag. At block 810, the communication object transmits the request package to the destination specified in the first route tag, usually the remote service object.

After block 810, the communication object is finished with processing the current request package, so at block 812 it waits to receive a response package that responds to the commands in the request package. The communication object does not necessarily enter a wait state where it can do nothing else until it receives a response; it is entirely possible for the communication object to be able to process other request packages while waiting for responses to previous request packages. At block 814, the local service object checks whether a response has been received. If no response has been received it returns to block 812.

If at block 814 a response has been received, the process goes to block 816 where it checks whether the response package's payload requires any decoding. In embodiments where the communication protocol supported by the communication object and communication path cannot transfer the payload in its native format, it can be necessary to encode the payload before transmission and decode it after reception. For example, if the response package payload includes binary data and the communication path and communications objects do not support binary, it can be necessary to encode the binary into a form that the communication elements can support. In one embodiment, binary data can be encoded and decoded using uuencode, but in other embodiments other methods can be used.

If at block 816 the response package does not required decoding, then the process goes to block 820, where it transmits the response package to the local service object. Otherwise, if the response package payload does require encoding for transmission, it proceeds to block 818, where it encodes the payload, and then proceeds to block 820 where it transmits the encoded response package to the communication object with which it is coupled by a communication path.

Figure 9:
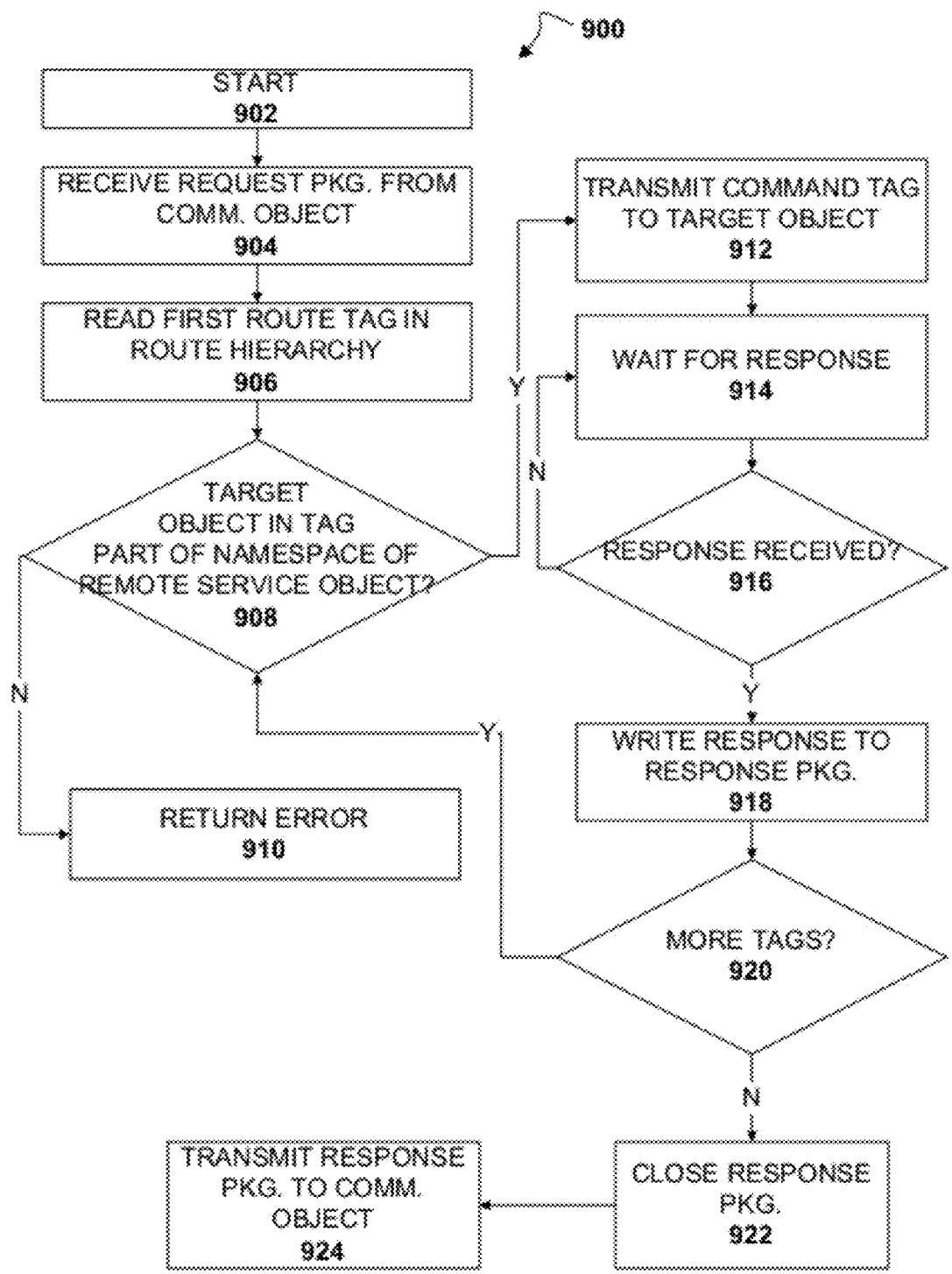
FIG. 9 is a flowchart of an embodiment of a process for a remote service object.

FIG. 9 illustrates an embodiment of a process for a remote service object such as object 210 (see FIG. 2). The process starts at block 902. At block 904, the request package is received from a communication object such as object 208. At block 906, the remote service object reads the first tag in the request package and at block 908 it determines whether the tag refers to a target object that is in its namespace (i.e., with which it can communicate). If the target object is not in its namespace, then at block 910 it returns an error, but if the target object is in its namespace then the process proceeds to block 912, where the remote service object transmits the command to the target object.

After block 912, the remote service object is finished with processing the first command, so at block 914 it waits to receive a response to the first command. The remote service object does not necessarily enter a wait state where it can do nothing else until it receives a response; it is entirely possible for the remote service object to be able to process responses from other target objects packages while waiting for responses to previous commands. At block 916, the local service object checks whether a response has been received. If no response has been received it returns to block 914, but if a response has been received it proceeds to block 918 where it writes the response from the target object into a response package.

At block 920, the process checks whether the request package has any further tags for the same target object or for another target object. If the request package has more tags, the process returns to block 908 and goes through the process again with the next tag. If the request package has no further tags, then the response package is closed at block 922 and at block 924 the response package is transmitted to the communication object.

Figure 10:
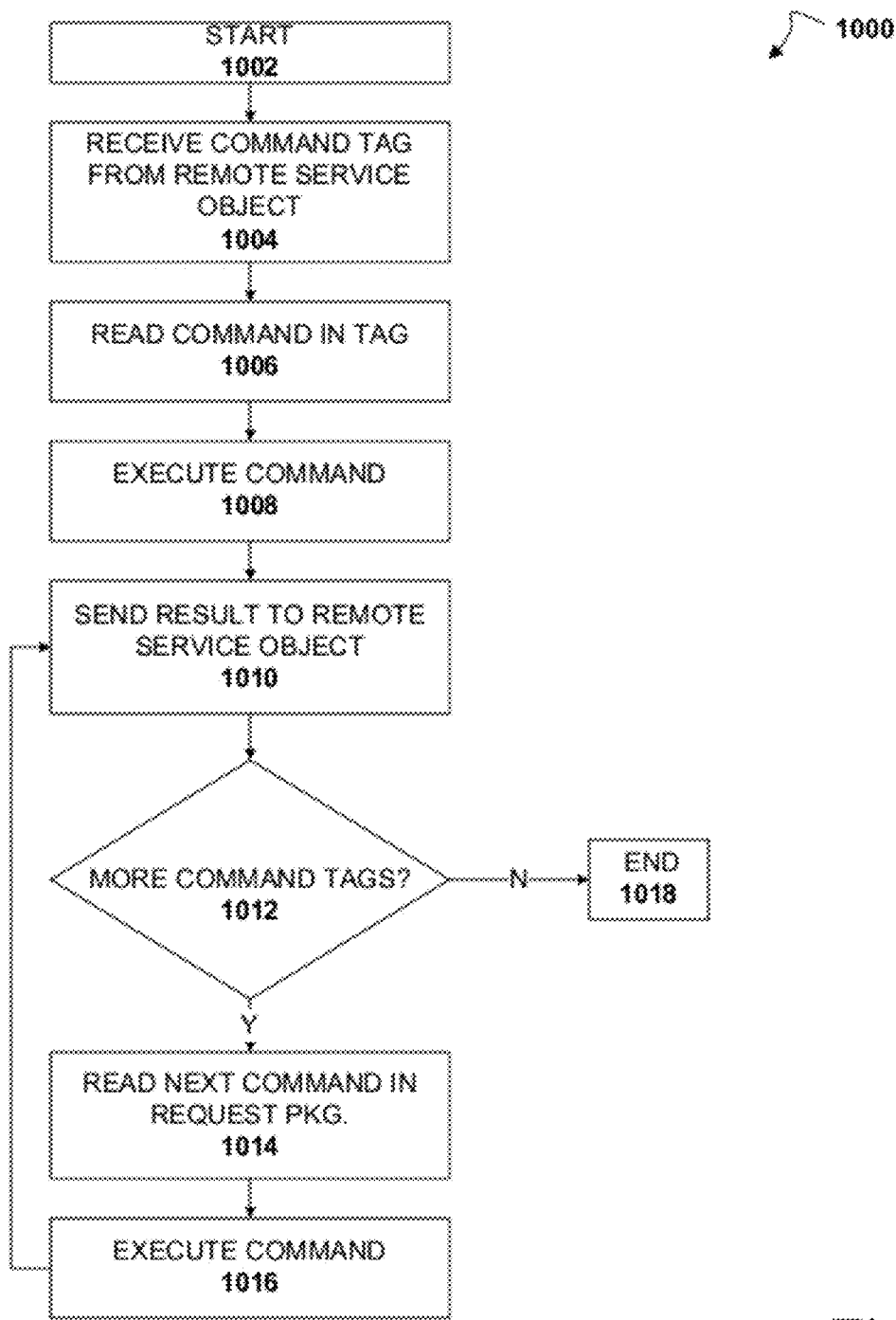
FIG. 10 is a flowchart of an embodiment of a process for a target object.

FIG. 10 illustrate an embodiment of a process 1000 for a target object such as target objects 212 and/or 214 (see FIG. 2). The process starts at block 1002. At block 1004, the target object receives a tag from the remote service object and at block 1006 it reads the command in the tag. At step 1008 the target object executes the command and at block 1010 is sends the result to the remote service object so that it can be included in the response package. At block 1012 the process checks whether there are any more tags with commands to be executed. If there is not, then the process ends at block 1018. If there are more tags with commands to be executed, then at block 1014 the next command is read and at block 1016 it is executed, and at block 1010 the result is sent to the remote service object.

FIGS. 11A-11C illustrate different embodiments of response packages that can be produced by target object, in this case a target object named "vscape" (see, e.g., FIG. 2). FIG. 11A illustrates a response package that responds to a "gettree" command received from an origin object. The response package includes a header, in this case the "mixl" and "response" tags, along with a payload that displays the tree—that is, the steps and datums within object vscape. In this response package, both the header and the payload are in XML format, so this response package would require no encoding or decoding for transmission.

FIG. 11B illustrates an embodiment of a response package with a payload that includes binary data. Binary data can be written to a response package without uuencoding using the BinaryTag helper class of objects. The assumption here is that a <get> had been done on a binary field named "mybin." This is very similar to the logic to handle a normal <get>, but a BinaryTag was used instead of Tag. The second parameter to the BinaryTag constructor should be a GUID (Globally Unique Identifier) to ensure an unambiguous interpretation of the binary information.

FIG. 11C illustrates an embodiment of a response package that includes graphics in the payload. Graphics can be represented by tags conforming to SVG, which is a language for describing two-dimensional graphics and graphical applications in XML. The specification is maintained by w3.org at http://www.w3.org/Graphics/SVG.

FIG. 12 illustrates an embodiment of an object 1200. In cases where an object does not used the standard command language used in the request package as its native language, it can be necessary to modify the object. Object 1200 illustrates an object 1202 that has been "wrapped" in additional code 1204 to make its command structure compatible with the standard command language. Additional code 1204 can be added to object 1202 by incorporating a header in at the beginning of the code of object 1202. In effect, additional code 1204 makes object 1202 derive from a base class of objects that understand the standard command language and can "translate" between the standard command language and the native command language of object 1202. In one embodiment, additional code 1204 can be a lightweight schema that wraps the existing schema of object 1202, but in other embodiments additional code 1204 can perform other or additional functions. In operation, then, object 1200 receive a tag from a request package and object 1202 and additional code 1204 work together to process the tag and provide a response. In cases where object 1202 already understands the standard command language, object 1202 need not be wrapped with additional code 1204.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A process comprising:
   retrieving a list of one or more candidate objects with which an origin object can communicate using a standard command language, wherein at least one of the one or more candidate objects uses a command language different than the standard command language, and wherein retrieving the list comprises:

assembling at an origin object a request package including routing commands and commands for a remote service object in the standard command language, and transmitting the request package from the origin object to the remote service object;
querying the schema of one or more target objects selected from among the one or more candidate objects; and
using the standard command language to transmit to the one or more target objects commands and/or data consistent with the schemas of the target objects.

2. The process of claim 1 wherein transmitting the request package comprises:
transmitting the request package from the origin object to a local service object;
transmitting the request package through one or more communication objects in a communication path between the local service object and the remote service object; and
delivering the request package from the last communication object in the communication path to the remote service object.

3. The process of claim 1 wherein querying the schema of the specific target object comprises:
assembling at the origin object a request package including routing commands and schema query commands in the standard command language;
transmitting the request package from the origin object to the one or more target objects; and
receiving a response package that sets forth the schemas of the one or more target objects.

4. The process of claim 3 wherein transmitting the request package comprises:
transmitting the request package to a local service object;
transmitting the request package through one or more communication objects in a communication route between the local service object and the remote service object;
delivering the request package from the last communication object in the communication path to the remote service object; and
delivering the request package from the remote service object to the one or more target objects.

5. The process of claim 4, further comprising:
assembling a response package including responses from each of the one or more target objects to which commands were directed in the request package, the response package including a header and a payload; and
transmitting the response package to the origin object.

6. The process of claim 5 wherein transmitting the response package to the origin object comprises:
transmitting the response package to the remote service object;
transmitting the response package through one or more communication objects in a communication path between the remote service object and the local service object;
delivering the response package from the last communication object in the communication path to the local service object; and
delivering the response package from the local service object to the origin object.

7. The process of claim 6 wherein transmitting the response package comprises:
encoding the payload after the remote service object; and
decoding the payload before the local service object.

8. The process of claim 5 wherein the header is extensible markup language (XML) data and the payload is XML data, binary data or scalable vector graphics (SVG) data.

9. An apparatus comprising:
a processor;
an origin object running on the processor, the origin object including instructions that, when executed by the processor, cause the processor to:
retrieve a list of one or more candidate objects with which the origin object can communicate using a standard command language, wherein at least one of the one or more candidate objects uses a command language different than the standard command language;
assemble a request package including routing commands and commands for a remote service object in the standard command language;
transmit the request package from the origin object to a remote service object running on an additional processor;
query the schema of one or more target objects selected from among the one or more candidate objects; and
use the standard command language to transmit to the one or more target objects commands and/or data consistent with the schemas of the target objects.

10. The apparatus of claim 9 wherein the instructions to transmit the request package comprise instructions to:
transmit the request package from the origin object to a local service object running on the processor;
transmit the request package through one or more communication objects in a communication path between the local service object and the remote service object; and
deliver the request package from the last communication object in the communication path to the remote service object.

11. The apparatus of claim 9 wherein the instructions for querying the schema of the specific target object comprise instructions to:
assemble a request package including routing commands and schema query commands in the standard command language;
transmit the request package from the origin object to the one or more target objects; and
receive a response package that sets forth the schemas of the one or more target objects.

12. The apparatus of claim 11 wherein the instructions to transmit the request package comprise instructions to:
transmit the request package to a local service object running on the processor;
transmit the request package through one or more communication objects in a communication route between the local service object and a remote service object running on an additional processor;
deliver the request package from the last communication object in the communication path to the remote service object; and
deliver the request package from the remote service object to the one or more target objects.

13. The apparatus of claim 12, wherein the remote service object includes instructions to cause the additional processor to:
assemble a response package including responses from each of the one or more target objects to which commands were directed in the request package, the response package including a header and a payload; and
transmit the response package to the origin object.

14. The apparatus of claim 13 wherein the instructions to transmit the response package to the origin object comprise instructions to cause the additional processor to:
transmit the response package to the remote service object;

transmit the request package through one or more communication objects in a communication path between the remote service object and the local service object;

deliver the request package from the last communication object in the communication path to the local service object; and deliver the request package from the local service object to the origin object.

15. The apparatus of claim 14 wherein the instructions to transmit the request package comprise instructions to:

encode the payload after the remote service object; and decode the payload before the local service object.

16. The apparatus of claim 14 wherein the header is extensible markup language (XML) data and the payload is XML data, binary data or scalable vector graphics (SVG) data.

* * * * *